United States Patent [19]
Betensky et al.

[11] Patent Number: 5,241,337
[45] Date of Patent: Aug. 31, 1993

[54] REAL IMAGE VIEWFINDER REQUIRING NO FIELD LENS

[75] Inventors: Ellis I. Betensky, W. Redding, Conn.; Paul L. Ruben, Penfield, N.Y.

[73] Assignee: Eastman Kodak Company, Rochester, N.Y.

[21] Appl. No.: 699,284

[22] Filed: May 13, 1991

[51] Int. Cl.$^5$ .................. G03B 13/10; G03B 13/14
[52] U.S. Cl. ........................ 354/219; 354/221; 354/222
[58] Field of Search .................. 354/219–225; 359/643–647, 676–678

[56] References Cited

U.S. PATENT DOCUMENTS

| | | | |
|---|---|---|---|
| 4,707,098 | 11/1987 | Wakamiya | 354/219 |
| 4,707,103 | 11/1987 | Ikemori et al. | 354/225 |
| 4,838,668 | 6/1989 | Betensky et al. | 354/222 |
| 4,887,109 | 12/1989 | Fujita et al. | 354/222 |
| 4,972,216 | 11/1990 | Ueda et al. | 354/225 |
| 5,014,078 | 5/1991 | Kudo et al. | 354/195.1 |
| 5,052,787 | 10/1991 | Sugawara | 359/683 |

FOREIGN PATENT DOCUMENTS

| | | |
|---|---|---|
| 3806942A1 | 9/1988 | Fed. Rep. of Germany . |
| 1-116617 | 5/1989 | Japan . |
| 1-131510 | 5/1989 | Japan . |
| 1-197717 | 8/1989 | Japan . |
| 1-233430 | 9/1989 | Japan . |
| 1-309020 | 12/1989 | Japan . |

*Primary Examiner*—David M. Gray
*Attorney, Agent, or Firm*—Svetlana Z. Short

[57] ABSTRACT

A real image zooming viewfinder comprising three optical units with refracting optical power and an additional moving reflective optical unit. Zooming is accomplished by moving one of the refractive optical units and the additional reflective optical unit or by moving the first and the second optical units. The need for field lens is eliminated by having the first and the second unit cooperate to make the finder system telecentric with respect to principal rays at the intermediate image plane.

21 Claims, 2 Drawing Sheets

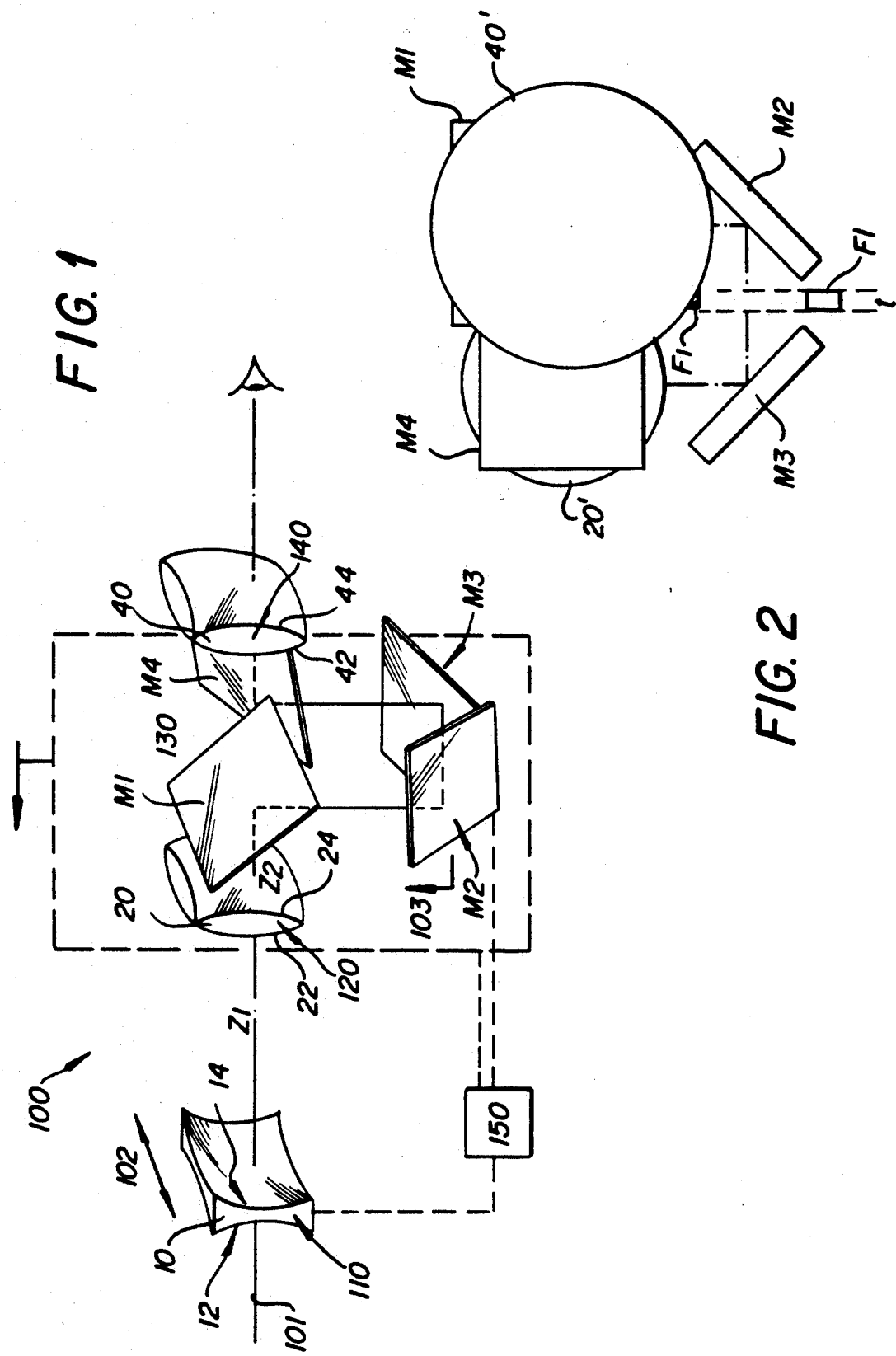

REAL IMAGE VIEWFINDER REQUIRING NO FIELD LENS

CROSS-REFERENCE TO RELATED APPLICATIONS

This application is related to U.S. patent application Ser. No. 699,286, filed May 13, 1991 and entitled OPTICAL SYSTEM WITH IMPROVED FIELD MASK, filed in the names of Betensky et al. and U.S. patent application Ser. No. 699,012, filed May 13, 1991 and entitled REAL IMAGE ZOOM VIEWFINDER filed in the names of Betensky et al.

BACKGROUND OF THE INVENTION

1. Field of the Invention

The invention relates to zoom viewfinder systems. Such systems are useful in photographic cameras.

2. Description Relative to the Prior Art

Cameras using zoom lens systems are well known. In such cameras viewing of the scene by the operator is facilitated by providing a viewfinding device, i.e., a viewfinder that allows the operator to view the object whose image is being recorded by the camera. In those cameras providing through the lens reflex viewing, the image of the object is viewed immediately prior to exposure by using a mirror which is moved before exposure of the film. Camera cost savings may be realized by eliminating the reflex viewing system. However, a need arises to provide a viewing system separate from the exposing system and to have said viewing system be provided with the ability to continuously vary the angular field of view, popularly referred to as zooming. Heretofore, zoom viewfinders of the Galillean type have been suggested. However, because zoom viewfinders of the Galillean type become increasingly large and complex when designed to the 2:1 and greater variable power range and because they have a poorly delineated field of view, other known systems consisting of a zooming objective as the first portion followed by an eyepiece have been developed. While these other systems can be designed for large variable power ranges, they also can become large and complex because of the need for an erecting means. Other systems also employ field lenses to redirect light near the edge of the field of view into the exit (i.e., viewing) pupil. If the field lens is not used, only light from the central portion of the image will reach the eye. U.S. Pat. No. 4,972,216 describes a camera having a real image viewfinder. The disclosed viewfinder has a front optical unit serving as an objective lens, a second optical unit that is a reflective assembly and a third optical unit serving as an eyepiece. The patent does not disclose a field lens. Without a field lens, as the user of the camera looks at the real image, the edges of the field of view appear dim and fade away. The field lens would correct this problem but it represents an extra element and, thus, additional complexity and cost to the lens system.

SUMMARY OF THE INVENTION

It is, therefore, one object of the invention to provide a compact zoom viewfinder or a optical finder system that is relatively inexpensive. These and other objects of the invention, which will become apparent from a reading of this specification, are realized by a zoom viewfinder system that can be comprised of three optical units (with optical power) having as few as three lens elements. The optical finder system includes a first and a second optical unit which together cooperate for forming a real image of the object, a reflective optical assembly where the intermediate real image is located and an eyelens to facilitate the viewing of the object. According to the present invention, the first and second optical units cooperate to make the principal or chief rays nearly parallel to the optical axis in the vicinity of the intermediate real image, thus eliminating the need for a field lens. That is the lens powers are chosen so that the system is substantially telecentric with respect to the principal rays in the vicinity of the intermediate image plane. The variator lens is redirecting the light to the real image so that the exit pupil of the zoom objective and the entrance pupil of the eyepiece are located at or near infinity. This is achieved by placing the entrance pupil of the zoom objective at or near the front focal point. Therefore, the system is substantially telecentric in a vicinity of the real image plane. Since the focal length of the eye lens is determined by (and is substantially equal to) the eye relief distance, the focal lengths of the zooming portions are also determined.

Zooming can be performed by moving a single optical unit having a refractive optical power and a single additional reflective optical unit or, alternatively, by moving the front and the second optical units. More specifically, a zoom viewfinder system comprises a first negative unit which can be moved for zooming as a compensator (for the variator movement) followed by a second moving positive unit (i.e., the variator) to effect magnification change and in conjunction with the first optical unit to form a real image, followed by a reflective assembly which may include the means for variable path length, and a fixed positive unit which serves as an eye lens.

Furthermore, using only one type of optical material, such as acrylic, the lateral color may be corrected for zoom ranges extending to at least 3:1. To further simplify construction, the first lens element can be fixed, and the vertical spacing between the upper and lower portions of the reflective unit can be altered as the variator lens component moves during zooming to provide the compensating motion. This results in a less complex system of three lens elements, one of which is moved for zooming, and a zero power mirror subsystem which is moved for compensating the shift in image location. By moving this mirror subsystem, however, the image location moves axially between the lower reflective components in order to remain fixed at the front focal plane of the eye lens. Therefore, for a fixed field mask to be positioned at the image location, it must be of sufficient finite thickness to enable its edges, which define the field of view, to be in constant sharp focus despite the axial shift of the image between the lower reflective components. That is, the field mask thickness must equal or exceed the total axial shift of the image between the lower reflective components. Otherwise, the complexity of a thin field mask linked to the axial movement of the image between the lower reflective components, is required. A further advantage of the first element is that it may be moved laterally (i.e, side to side) to provide correction for parallax.

BRIEF DESCRIPTION OF THE DRAWINGS

Embodiments of the present invention will now be described, by way of example, with reference to the accompanying drawings, in which:

FIG. 1 is a diagram in perspective of a first embodiment of a zoom viewfinder.

FIG. 2 is a diagram of the rear view of the zoom finder of FIG. 1.

DETAILED DESCRIPTION OF THE PREFERRED EMBODIMENTS

First Illustrative Embodiment

Figure 3:
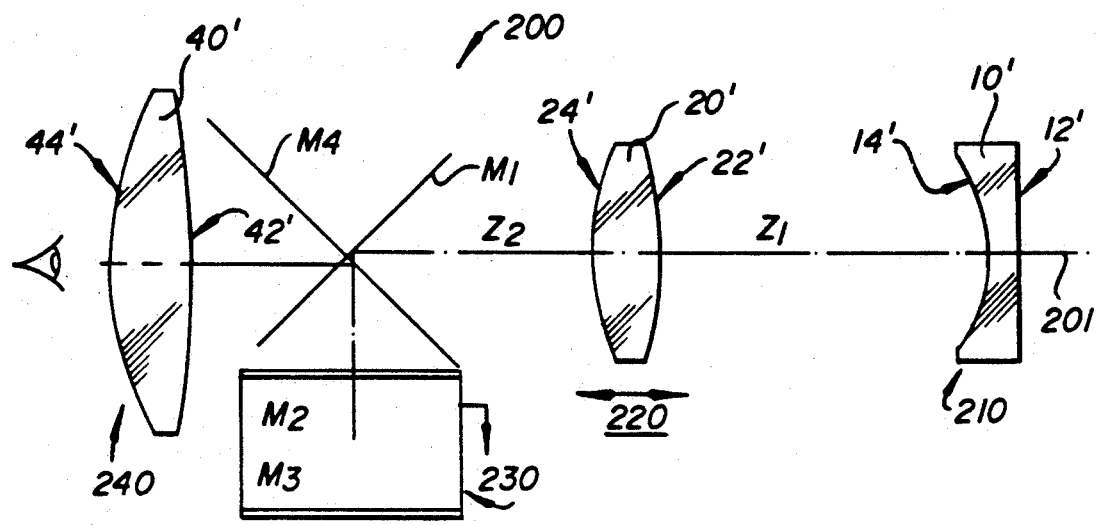
FIG. 3 is a diagram of a second embodiment of a zoom viewfinder.

The viewfinder 100 represented in FIG. 1 is a 2.3× real image zoom viewfinder. The viewfinder 100 has an optical axis 101 and includes four optical units 110, 120, 130 and 140. The optical unit 110 of the first embodiment is a zooming unit. It is moved axially to provide compensation for the image shift introduced or caused by the variator motion (i.e., unit 120 motion). Optical unit 110 consists of a negative lens component 10. Lens component 10 serves as a negative objective and is a single biconcave lens element having a front surface 12 and a rear surface 14. Surface 14 has a smaller radius of curvature than surface 12 and thus is more powerful than surface 12. Surface 14 is also aspherical. The specific parameters describing this lens element are given in Table 1.

The second optical unit 120 moves axially back and forth along the optical axis 101 as a variator during zooming and effects a change in magnification of the real image. It consists of a positive lens component 20. Lens component 20 is a single biconvex lens element having a front surface 22 and a rear surface 24. Surface 24 is an aspherical surface. The specific surface parameters for the lens element 20 are also given in Table 1.

The third optical unit is a reflective assembly 130. The reflective mirror assembly 130 consists of 4 mirrors: M1, M2, M3 and M4, arranged in a type-2 Porro prism-like configuration. The mirror assembly 130 inverts (erects) and, reverts the image. The magnification of the finder can be alternatively changed by moving a pair of mirrors M2 and M3 vertically while moving optical unit 120 axially and while keeping the unit 110 stationary (i.e., fixed) during zooming. This may be made by using an appropriate gear and cam mechamism 150. A real image is formed between the second and third mirrors, shown in FIG. 2 so the field stop F1 or mask may be located there. In the vicinity of the real image plane the chief (or principal) rays are substantially parallel. Thus, the need for the field lens is eliminated.

Figure 4:
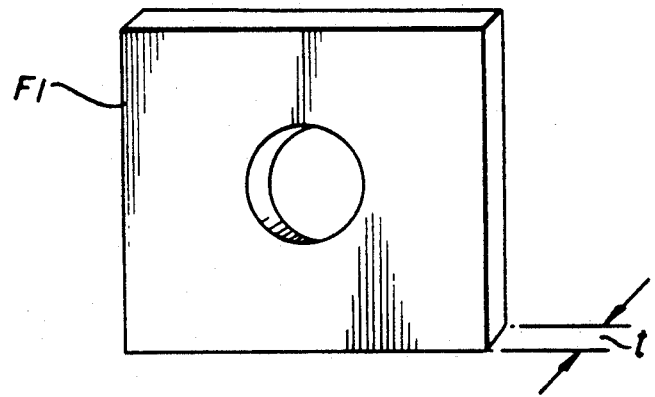
FIG. 4 is a diagram of a field stop/field mask.

Because the image plane drifts axially between the two mirrors, the field stop/field mask F1 can be made to move with the image. However, as noted in the first of the cross-referenced applications Ser. Nos. 699,286 and 699,012, an improved expedient would be to have the field stop be of a thickness that is equivalent to the image plane drift distance, thus, provision of a device for moving the field stop separately is eliminated. In this embodiment the image plane drifts by 1.04 mm., therefore, a field stop F1 thickness, t (FIG. 4), of about 1.1 mm is adequate.

The fourth optical unit 140 which is a rearmost unit, contains a positive lens component 40 and is stationary. Lens component 40 is a biconvex lens element having a front surface 42 and a rear surface 44. Lens component 40 serves as an eye lens and is held stationary, i.e., fixed during zooming.

In addition to the motions of the variator 120 and the compensator 110 required to provide zooming, the front negative lens component 10 of unit 110 may be advantageously displaced laterally, i.e., perpendicularly to the optical axis 101 as indicated by arrows 102, to provide parallax compensation. For a zoom taking lens to viewfinder optical axes separation of 50 mm, to correct parallax from infinity to 0.5 meters, the front element should be displaced 0.71 mm.

Various constructional parameters of the optical system, when in its short focal length conditions, are given in Table 1.

TABLE 1

|  | RADIUS | THICKNESS | MATERIAL TYPE |
|---|---|---|---|
| Lens element 10 | −85.988 | 1.00 | acrylic |
|  | 4.933 (3) | Z1(1) |  |
| Lens element 20 | 13.759 | 2.50 | acrylic |
|  | −7.959 (4) | Z2(2) |  |
| Lens element 40 | 25.240 (5) | 3.00 | acrylic |
|  | −12.443 | 22.39 |  |
|  | PUPIL OF EYE |  |  |

NOTES:
(1) (2) Zoom space. Refer to ZOOM DATA TABLE, TABLE 3.
(3) (4) (5) Aspherical surface. Sag Z is defined per following formula:

$$z = \frac{cy^2}{1 + \sqrt{[1 - (1+k)c^2y^2]}} + Dy^4 + Ey^6 + Fy^8 + Gy^{10} + Hy^{12} + Iy^{14}$$

where 1/C is radius of curvature for the surface, and k is the conic constant of the surface. y is the marginal ray height, and where D, E, F, G, H and I are defined in Table 2.

TABLE 2

POLYNOMIAL ASPHERES
(COEFFICIENTS OF THE EVEN POWERED TERMS)

| NO. | D (4th) | E (6th) | F (8th) |
|---|---|---|---|
| (3) | 1.3882E − 03 | 1.5508E − 05 | −9.3330E − 06 |
| (4) | 8.6265E − 04 | −1.3786E − 04 | 2.1750E − 05 |
| (5) | −7.1589E − 05 | −3.2260E − 06 | 1.5573E − 08 |

| NO. | G (10th) | H (12th) | I (14th) |
|---|---|---|---|
| (3) | 4.2796E − 07 | 6.9955E − 08 | 5.6732E − 09 |
| (4) | −1.0064E − 06 | −5.6207E − 08 | 4.3911E − 09 |
| (5) | 1.5367E − 09 | 5.6142E − 12 | −8.8297E − 13 |

All dimensions throughout this specification are in millimeters unless otherwise stated.

The spaces between lens component 20 and lens component 30, i.e., air space Z1, as well as airspace Z2 vary during zooming and some values, including those corresponding to magnification at the extremes, are shown in Table 3.

TABLE 3

ZOOM DATA TABLE

| MAGNIFICATION | AIR SPACE Z1 | AIR SPACE Z2 |
|---|---|---|
| .351 | 16.500 | 2.626 |
| .390 | 14.851 | 2.391 |
| .430 | 13.476 | 4.173 |
| .470 | 12.333 | 4.957 |
| .486 | 11.929 | 5.270 |
| .510 | 11.372 | 5.738 |
| .550 | 10.548 | 6.522 |
| .590 | 9.840 | 7.301 |
| .630 | 9.218 | 8.085 |
| .670 | 8.672 | 8.867 |
| .710 | 8.187 | 9.649 |

TABLE 3-continued

| | ZOOM DATA TABLE | |
|---|---|---|
| MAGNIFICATION | AIR SPACE Z1 | AIR SPACE Z2 |
| .752 | 7.767 | 10.624 |

The largest and the smallest magnification value corresponding to the first illustrative embodiment are listed in the preceding table and the corresponding zoom ratio is approximately the ratio of those two figures. When distortion of the system is taken into account, the zoom ratio is 2.3.

Second Illustrative Embodiment

The compact viewfinder 200 represented in FIG. 3 is a 2.8× real image zoom viewfinder. The viewfinder may occupy a space 39 mm long, 25 mm wide and 21 mm high. The viewfinder 200 has an optical axis 201 and includes four optical units 210, 220, 230 and 240. The optical unit 210 of the first embodiment may move to provide compensation during zooming, or may remain stationary, i.e., does not move along the optical axis for zooming. Lens unit 210 may move laterally (i.e., side to side) for parallax correction as discussed above for the first illustrative embodiment, and consists of a negative lens component 10'. Lens component 10' is a single biconcave lens element having a front surface 12' and a rear surface 14'. Surface 14' has a smaller radius of curvature than surface 12' and thus is more powerful than surface 12'. Surface 14' is also aspherical. The specific parameters describing this lens element are given in Table 4.

The second optical unit 220 moves axially during the zooming action to effect a magnification change. The second optical unit 220 consists of a positive lens component 20'. Lens component 20' is a single biconvex lens element having a front surface 22' and a rear surface 24'. Surface 24' is an aspherical surface. The specific surface parameters for this lens element are also given in Table 4.

The third optical unit is a reflective assembly 230. The third optical assembly of the second illustrative embodiment consists of two subunits. The first subunit is comprised of mirrors M1 and M4. The second group subunit is comprised of two mirrors M2 and M3. If the first optical unit 210 is stationary during zooming, the magnification of the zoom viewfinder can be changed by moving the second optical unit 220 along the optical axis 201 while moving mirrors M2 and M3 vertically at the same time. That is, mirrors M2 and M3 move in an up and down direction in response to moving of the optical unit 220. Otherwise, the mirrors do not move, i.e., they are stationary. Since the image plane, located between mirrors M2 and M3, drifts axially between the mirrors by about 5.6 mm, a field stop thickness should be 5.6 mm or larger. In the vicinity of the real image plane the chief (or principal) rays are substantially parallel, i.e., the system is telecentric with respect to these rays. Thus, the need for the field lens is eliminated.

The fourth optical unit 240 which is rearmost contains a positive lens component 40' and is stationary. Lens component 40' is a biconvex lens element having a front surface 42' and a rear surface 44'. Surface 44' is an aspherical surface.

Various constructional parameters of the optical system, when in its short focal length conditions, are given in Table 4.

TABLE 4

| | RADIUS | THICKNESS | MATERIAL TYPE |
|---|---|---|---|
| Lens element 10' | −24.1866 | 1.00 | acrylic |
| | 14.2806 (3) | Z1(1) | |
| Lens element 20' | 11.6342 | 2.70 | acrylic |
| | −13.2610 (4) | Z2(2) | |
| Lens element 40' | 92.0099 | 3.10 | acrylic |
| | −10.7746 (5) | 22.24 | |

(1) (2) Zoom space. Refer to ZOOM DATA TABLE.
(3) (4) (5) Aspherical surface. Sag is defined per following formula:

$$z = \frac{cy^2}{1 + \sqrt{[1 - (1 + k)c^2y^2]}} + Dy^4 + Ey^6 + Fy^8 + Gy^{10} + Hy^{12} + Iy^{14}$$

where 1/C is radius of curvature for the surface, and K is the conic constant of the surface.

TABLE 5

| POLYNOMIAL ASPHERES (COEFFICIENTS OF THE EVEN POWERED TERMS) | | | |
|---|---|---|---|
| NO. | D (4th) | E (6th) | F (8th) |
| 3 | −6.6976E − 04 | 3.0536E − 05 | −2.0633E − 06 |
| 4 | 6.9506E − 05 | −2.2428E − 05 | 2.6700E − 06 |
| 5 | −7.7865E − 06 | 1.4656E − 06 | −6.9094E − 08 |
| NO. | G (10th) | H (12th) | I (14th) |
| 3 | 3.1544E − 08 | 2.6902E − 09 | −7.8763E − 11 |
| 4 | −6.5908E − 08 | −2.5406E − 09 | 9.6469E − 11 |
| 5 | −1.2694E − 10 | 3.3673E − 11 | −2.9428E − 13 |
| CONIC CONSTANTS | | | |
| NO. | VALUE | | |
| 2 | −5.81581E − 01 | | |
| 4 | −6.59321E + 00 | | |
| 6 | −1.28134E + 00 | | |

TABLE 6

| | ZOOM SPACING DATA | |
|---|---|---|
| POS | Z1 | Z2 |
| 1 | 24.0833 | 35.5000 |
| 2 | 12.1651 | 39.1547 |
| 3 | 4.6981 | 45.3670 |

In the embodiments described in lens powers are chosen so that the principal rays are nearly parallel at the vicinity of the intermediate real image, thus eliminating the need for a field lens. Furthermore, using only one type of optical material, such as acrylic, the lateral color may be corrected for zoom ranges extending to at least 3:1. To further simplify construction, the first lens element can be fixed, and the vertical spacing between the upper and lower portions of the reflective unit can be altered as the variator lens component moves axially during zooming to provide the compensating motion. This results in a less complex system of three lens elements, one of which is moved for zooming, and a zero power mirror subsystem which is moved for compensating the shift in image location. A further advantage of the fixed first element is that it may be moved laterally (i.e, side to side) to provide correction for parallax.

It should be obvious that weak optical components which do not significantly alter third order aberration corrections or the like might be added, but the term "lens element" or "lens component" is not intended to include such element or component for purposes of the present application.

It should be obvious that prisms can be used as well as mirrors.

For example, in the second illustrative embodiment mirrors M2 and M3 can be substituted by a prism and the design will still fall within the spirit of our invention. The finder may be provided with a delineated central aiming area. Thus, an etched plano plate, colored dot or wire reticle can be located at the real image plane.

The invention has been described in detail with particular reference to several presently preferred embodiment, but it will be understood that variations and modifications can be effected within the spirit and scope of the invention.

It is obvious to anyone knowledgeable in the art that some variation of eye accommodation required during magnification change is acceptable.

Therefore, if magnification range is appropriately restricted, the invention can be constructed without the unit acting as a compensator.

There has thus been described a compact zoom viewfinder having relatively fewer parts, only one refracting group movable for zooming and which is relatively inexpensive to build.

We claim:

1. In an optical finder system without presence of a field lens having a field of view in object space of a half angle of at least 2° as defined by the principal rays the finder system including a reflective optical assembly including, a plurality of reflective surfaces; first and second optical units for forming a real image at an intermediate image plane in the reflective optical assembly; an eyelens to facilitate viewing of an object; and wherein the improvement comprises:
said first and said second optical units cooperate to make said principal rays substantially parallel to an optical axis at the intermediate image plane.

2. An optical finder system according to claim 1 wherein the first optical unit has negative optical power and the second optical unit has positive optical power.

3. An optical finder system according to claim 2, wherein the second optical unit moves along the optical axis for zooming as a variator to effect a magnification change, and optical elements of the reflective optical assembly move during zooming as a compensator.

4. An optical finder system according to claim 2 wherein the first optical unit moves along the optical axis during zooming to compensate for the movement of the second optical unit during zooming.

5. An optical finder system according to claim 2 in which the first lens element is moved laterally to provide for parallax correction for focusing on close objects.

6. An optical finder system according to claim 1 further comprising a three-dimensional field mask, said mask having a thickness substantially equal to the size of an image drift between optical elements of said reflective optical assembly.

7. An optical finder system according to claim 2 further comprising a three-dimensional field mask, said mask having a thickness substantially equal to a size of an image drift between optical elements of said reflecting assembly.

8. An optical finder system according to claim 1 in which all lens elements having refractive power are made from a same material.

9. In an optical finder system having a field of view including a first and a second optical unit which together cooperate for forming a real image in a reflective optical assembly, said reflective optical assembly including a plurality of optical elements having reflective surfaces, and an eyelens to facilitate the viewing of the object; wherein the improvement comprises:
the first and the second optical units cooperating to make the finder system substantially telecentric with respect to said principal rays at an intermediate image plane.

10. An optical finder system according to claim 9 wherein the first optical unit has negative optical power and the second optical unit has positive optical power.

11. An optical finder system according to claim 10, wherein the second optical unit moves along the optical axis for zooming as a variator to effect a magnification change, and the optical elements of the reflective optical assembly move during zooming as a compensator.

12. An optical finder system according to claim 10 wherein the first optical unit moves along the optical axis during zooming to compensate for the movement of the second optical unit during zooming.

13. An optical finder system according to claim 10 in which a first lens element is moved laterally to provide for parallax correction for focusing on close objects.

14. An optical finder according to claim 10 further comprising a three-dimensional field mask, said mask having a thickness substantially equal to the size of an image drift between optical elements of said reflective optical assembly.

15. An optical finder system according to claim 9 further comprising a three-dimensional field mask, said mask having a thickness substantially equal to the size of an image drift.

16. An optical finder system that does not have a field lens, the system consisting of three optical units each having optical power, the system having only three lens elements with refractive optical power and an additional reflective erecting assembly for erecting an image of an object, said optical units being a first negative optical unit, a second positive optical unit which moves to effect a magnification change and to form a real image, and a third positive optical unit used to view said real image, wherein said first and said second optical units cooperate to make principal rays substantially parallel to an optical axis at an intermediate image plane.

17. An optical finder system according to claim 1, wherein radii of surface aspheric coefficients, the thickness of the elements and the optical materials are as follows:

|  | RADIUS | THICKNESS | MATERIAL TYPE |
| --- | --- | --- | --- |
| First lens element | −85.988 | 1.00 | acrylic |
|  | 4.933 (3) | varies |  |
| Second lens element | 13.759 | 2.50 | acrylic |
|  | −7.959 (4) | varies |  |
|  |  | 30.18 |  |
| Third lens element | 25.240 (5) | 3.00 | acrylic |
|  | −12.443 | 22.39 |  |

| POLYNOMIAL ASPHERES (COEFFICIENTS OF THE EVEN POWERED TERMS) | | | |
| --- | --- | --- | --- |
| NO. | D (4th) | E (6th) | F (8th) |
| (3) | 1.3882E − 03 | 1.5508E − 05 | −9.3330E − 06 |
| (4) | 8.6265E − 04 | −1.3786E − 04 | 2.1750E − 05 |
| (5) | −7.1589E − 05 | −3.2260E − 06 | 1.5573E − 08 |

-continued

| NO. | G (10th) | H (12th) | I (14th) |
|---|---|---|---|
| (3) | 4.2796E − 07 | 6.9955E − 08 | 5.6732E − 09 |
| (4) | −1.0064E − 06 | −5.6207E − 08 | 4.3911E − 09 |
| (5) | 1.5367E − 09 | 5.6142E − 12 | −8.8297E − 13 |

18. An optical finder system according to claim 1, wherein radii of surface aspheric coefficients, the thickness of the elements and the optical materials are as follows:

| | RADIUS | THICKNESS | MATERIAL TYPE |
|---|---|---|---|
| Lens element 10′ | −24.1866 | 1.00 | acrylic |
| | 14.2806 (3) | varies | |
| Lens element 20′ | 11.6342 | 2.70 | acrylic |
| | −13.2610 (4) | varies | |
| Lens element 40′ | 92.0099 | 3.10 | acrylic |
| | −10.7746 (5) | 22.24 | |

(1) (2) Zoom space. Refer to ZOOM DATA TABLE.
(3) (4) (5) Aspherical surface. Sag is defined per following formula:

$$z = \frac{cy^2}{1 + \sqrt{[1 - (1 + k)c^2 y^2]}} + Dy^4 + Ey^6 + Fy^8 + Gy^{10} + Hy^{12} + Iy^{14}$$

where 1/C is radius of curvature for the surface, and K is the conic constant of the surface,

| POLYNOMIAL ASPHERES (COEFFICIENTS OF THE EVEN POWERED TERMS) | | | |
|---|---|---|---|
| NO. | D (4th) | E (6th) | F (8th) |
| 3 | −6.6976E − 04 | 3.0536E − 05 | −2.0633E − 06 |
| 4 | 6.9506E − 05 | −2.2428E − 05 | 2.6700E − 06 |
| 5 | −7.7865E − 06 | 1.4656E − 06 | −6.9094E − 08 |
| NO. | G (10th) | H (12th) | I (14th) |
| 3 | 3.1544E − 08 | 2.6902E − 09 | −7.8763E − 11 |
| 4 | −6.5908E − 08 | −2.5406E − 09 | 9.6469E − 11 |
| 5 | −1.2694E − 10 | 3.3673E − 11 | −2.9428E − 13 |

| CONIC CONSTANTS | |
|---|---|
| NO. | VALUE |
| 2 | −5.81581E − 01 |
| 4 | −6.59321E + 00 |
| 6 | −1.28134E + 00 |

19. In an optical finder system without presence of a field lens, the finder system including a reflective optical assembly including, a plurality of reflective surfaces; first and second optical units for forming a real image at an intermediate image plane in the reflective optical assembly; an eyelens to facilitate viewing of an object; and wherein the improvement comprises:
said first and said second optical units cooperate to make principal rays substantially parallel to an optical axis at the intermediate image plane, said first optical unit having negative optical power and said second optical unit having positive optical power.

20. An optical finder system according to claim 19 wherein said first optical unit moves along the optical axis during zooming to compensate for the movement of said second optical unit during zooming.

21. An optical finder system according to claim 20 in which first lens element is moved laterally to provide for parallax correction for focusing on close objects.

* * * * *